(12) United States Patent
Anderson et al.

(10) Patent No.: US 8,276,192 B2
(45) Date of Patent: Sep. 25, 2012

(54) SYSTEM AND METHOD FOR SECURITY PLANNING WITH HARD SECURITY CONSTRAINTS

(75) Inventors: Kay Schwendimann Anderson, Washington, DC (US); Pau-Chen Cheng, Yorktown Heights, NY (US); Genady Ya. Grabarnik, Scarsdale, NY (US); Paul Ashley Karger, Chappaqua, NY (US); Marc Lelarge, Plessis-Robinson (FR); Zhen Liu, Tarrytown, NY (US); Anton Viktorovich Riabov, Ossining, NY (US); Pankaj Rohatgi, New Rochelle, NY (US); Angela Marie Schuett, Columbia, MD (US); Grant Wagner, Columbia, MD (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 12/130,243

(22) Filed: May 30, 2008

(65) Prior Publication Data

US 2009/0055890 A1   Feb. 26, 2009

Related U.S. Application Data

(63) Continuation of application No. 11/484,418, filed on Jul. 11, 2006.

(51) Int. Cl.
*H04L 29/06* (2006.01)

(52) U.S. Cl. ............. 726/4; 709/225; 370/254; 370/255

(58) Field of Classification Search .................. 726/1–2, 726/29, 4
See application file for complete search history.

(56) References Cited

U.S. PATENT DOCUMENTS

| 5,831,610 | A | * | 11/1998 | Tonelli et al. | 715/735 |
| 6,058,262 | A | * | 5/2000 | Kawas et al. | 703/13 |
| 6,105,132 | A | * | 8/2000 | Fritch et al. | 713/167 |
| 2003/0005331 | A1 | * | 1/2003 | Williams | 713/201 |
| 2003/0172145 | A1 | * | 9/2003 | Nguyen | 709/223 |
| 2003/0196108 | A1 | * | 10/2003 | Kung | 713/200 |
| 2005/0096960 | A1 | * | 5/2005 | Plutowski et al. | 705/8 |
| 2005/0125269 | A1 | * | 6/2005 | Batra et al. | 705/7 |
| 2008/0168529 | A1 | * | 7/2008 | Anderson et al. | 726/1 |

OTHER PUBLICATIONS

Scherzer et al., ("Authenticating Mandatory Access Controls and Preserving Privacy for a High-Assurance Smart Card" , 2003, ESORICS 2003, pp. 181-200.*
Kichkaylo et al., "Constrained Component Deployment in Wide-Area Networks Using AI Planning Techniques", Proceedings of the International Parallel and Distributed Processing Symposium, 2003, 10 pages.*
Bell, D.E., La Padula, L. J., "Secure Computer System: Unified Exposition and Multics Interpretation," The Mitre Corporation, Project No. 522B, Report No. ESD-TR-75-306, Mar. 1976.

(Continued)

*Primary Examiner* — Taghi Arani
*Assistant Examiner* — Thaddeus Plecha
(74) *Attorney, Agent, or Firm* — F. Chau & Associates, LLC

(57) ABSTRACT

A method for security planning with hard security constraints includes: receiving security-related requirements of a network to be developed using system inputs and processing components; and generating the network according to the security-related requirements, wherein the network satisfies hard security constraints.

17 Claims, 2 Drawing Sheets

OTHER PUBLICATIONS

Schellhorn, G., Reif, W., Schairer, A., Karger, P., Austel, V., Toll, D., "Verification of a Formal Security Model for Multiapplicative Smart cards," Journal of Computer Security 10 (4): 339-368 (2002).

Blythe, J., Deelman, E., Gil, Y., Kesselman, C., Agarwal, A. Mehta, G., Vahi, K., The Role of Planning in Grid Computing, ICAPS 2003.

Kichkaylo T., Ivan, A., Karamcheti, V., "Constrained Component Deployment in Wide-Area Networks Using AI Planning Techniques," IPDPS 2003.

Doshi, P., Goodwin, R., Akkiraju, R., Verma, K., "Dynamic Workflow Composition using Markov Decision Processes," Proceedings of IEEE Second international Conference on Web Services, Jun. 2004.

Majithia, S., Walker, D.W., Gray, W. Alex, "Automating Scientific Experiments on the Semantic Grid," ISWC 2004.

Riabov, A., Liu, Z., "Planning for Stream Processing Systems," AAAI 2005.

Lelarge, M., Liu, Z., Riabov, A., "Automatic Composition of Secure Workflows," Working Paper.

Lelarge, M. Liu, Z. Riabov, A. "Automatic Composition of Secure Workflows," IBM Research Report, RC23996 (W0607-005) Jul. 5, 2006, Computer Science, pp. 1-27.

* cited by examiner

SYSTEM AND METHOD FOR SECURITY PLANNING WITH HARD SECURITY CONSTRAINTS

CROSS-REFERENCE TO RELATED APPLICATION

This application is a continuation of application Ser. No. 11/484,418, filed Jul. 11, 2006, the disclosure of which is incorporated by reference herein in its entirety.

GOVERNMENT INTERESTS

This invention was made with Government support under Contract No.: H98230-04-3-0001 awarded by the U.S. Department of Defense. The Government has certain rights in this invention.

BACKGROUND OF THE INVENTION

1. Technical Field

The present invention relates to network security, and more particularly, to security planning with hard security constraints.

2. Discussion of the Related Art

A component environment is an environment where entities (e.g., data, documents, machine parts or raw materials) are processed by a network or multiple networks of interconnected components (e.g., computers, business services, factory machinery, etc.). Each component can consume and produce entities. The components can be connected by delivery channels. If two components are connected, all or some of the entities produced by one or both of the components can be consumed by the other component.

The components can also consume entities taken from external (e.g., primal) sources if a corresponding source-component connection is established and the entities produced can be shipped outside the system. The entities shipped outside the system are considered a final product of the component network. The component environment provides the infrastructure necessary for connecting components, activating the components and delivery channels, and implementing the entire production cycle, delivering entities from sources, to components, and to consumers of the final product.

The main advantage of a component environment is component reuse. For example, different networks of components can be composed as needed to generate a final product according to current business requirements. The same component can participate in multiple networks. In some environments, for example, in computer systems processing data in digital formats, entities can be easily copied, which further increases potential reuse, thereby allowing the entities to be produced once but consumed multiple times by multiple processing components.

In many environments, components can be rearranged dynamically to form new networks to adapt to changing conditions, such as changing availability of primal sources or introduction of new (e.g., more efficient) components. Examples of component environments include computer systems such as semantic grid, stream processing, web services and autonomic computing systems, as well as automated production lines and business document flows.

In many applications, entities flowing in and out of a component network and between components are considered valuable entities and the value contained in the system must be protected. Value of an entity can be, for example:

1) Actual monetary value of a physical object (e.g., an entity), or replacement value of the entity, if the entity is a physical object.

2) An estimate of the loss resulting from making information public or releasing it to another party, if, for example, the entity is a private document, or an object containing secrets (e.g., trade secrets or personally identifiable information protected under privacy laws).

3) A combination of 1) and 2) when the entity has both monetary value and trade secret aspects, e.g., if secrets can be discovered by inspecting or reverse-engineering the entity.

Special security procedures are followed in such environments to prevent potential loss of entities. Without loss of generality, it can be assumed that the delivery channels between the components are trusted and secure since many well known techniques exist for creating secure delivery channels. For example, when the entities consist of data, cryptographic techniques can be applied to protect data in transit from being disclosed or modified.

As described above, losses can occur at the components if the components leak the entities or at the consumer side if the consumers of the product leak the entities. A method for controlling security risks in these environments is to restrict the set of entities exposed to components and product consumers to the minimum necessary required for system functionality. This can be achieved with the enforcement of access control policies, which are also known as hard security constraints. The term hard security constraints is used because the access control policies are strictly enforced, and violation of these policies leads to a security risk that cannot be easily quantified. In other words, the system satisfies the hard security constraints, or it does not.

To prevent losses, various security policies for access control are used. The most commonly used policies belong to one of two types: Mandatory Access Control (MAC) and Discretionary Access Control (DAC). In DAC policies, the principals owning the entities are allowed to grant and revoke access to other principals. In MAC policies, entities do not have owners, and access to entities is controlled by the environment based on categorization of the entities and clearance levels assigned to the principals. Both classes of access control policies specify a set of formal rules that are used by an enforcement or auditing facility to decide whether a subject can access an object, and take appropriate action (e.g., deny access or raise an alarm).

In component environments, the entities play the role of objects, and components play the role of subjects. Access control policies are implemented by assigning labels to objects and subjects, and specifying the access rules in terms of the labels. In particular, implementation of an access control policy may require that object labels are assigned to entities, and subject labels are assigned to components. Further, the policy compliance of a network of components can be verified using access control rules defined by the policy.

The literature in the field of access control commonly discusses permissions for subjects to "read" and "write" objects, which in the context of component environments corresponds to components consuming and producing entities. The "write" operation is understood as creating a new object (e.g., an entity), and not as modifying an existing object (e.g., the entity). In particular, the subject label of each component producing entity has "write" access to the object label of the produced entity, and the subject label of each component consuming an entity has "read" access to the object label of the consumed entity.

In many access control systems the set of subject labels is partially ordered. For example, for any subject label there can be a number of other subject labels that have "read" access to the same or a smaller set of object labels, which at the same time, have "write" access to the same or a larger set of object labels. In other words, the subject label assigned to a component can potentially be "reduced" in this partial order such that the subject label still allows "read" access to object labels of all consumed entities and "write" access to object labels of all produced entities and at the same time restrict "read" access to a smaller set of entities.

SUMMARY OF THE INVENTION

In an exemplary embodiment of the present invention, a method for security planning with hard security constraints comprises: receiving security-related requirements of a network to be developed using system inputs and processing components; and generating the network according to the security-related requirements, wherein the network satisfies hard security constraints.

The network is generated using a planning algorithm. The planning algorithm receives a planning task in Planning Domain Definition Language (PDDL) or Stream Processing Planning Language (SPPL) format. The hard security constraints are Bell-LaPadula constraints, Biba integrity constraints, Caernarvon model constraints or Role-based access control constraints.

The method further comprises receiving descriptions of the system inputs and processing components. The descriptions are metadata. The method further comprises deploying the network that satisfies hard security constraints in a real production system. The network includes a downgrader.

In another exemplary embodiment of the present invention, a method for security planning with access control policies comprises: receiving descriptions of available external inputs and processing components; receiving first security-related requirements of a first network to be developed using the available external inputs and processing components; and generating the first network according to the security-related requirements, wherein the first network satisfies access control policies.

Generating the first network according to the security-related requirements comprises: assigning object and subject labels to system inputs and processing components in the first network; and verifying access control policies for the system inputs and processing components in the first network.

The method further comprises: receiving second security-related requirements of a second network to be developed using the available external inputs and processing components; and generating the second network according to the second security-related requirements, wherein the second network satisfies the access control policies; and deploying the first or second networks that satisfy the access control policies in a real production system. The first or second networks that satisfy the access control policies are newly generated networks or modifications of existing networks. The method further comprises translating privacy constraints into access control policies.

In yet another exemplary embodiment of the present invention, a computer program product comprising a computer useable medium having computer program logic recorded thereon for security planning with hard security constraints, the computer program logic comprises: program code for receiving security-related requirements of a network to be developed using system inputs and processing components; and program code for generating the network according to the security-related requirements, wherein the network satisfies hard security constraints.

The computer program product further comprises: program code for receiving descriptions of the system inputs and processing components; and program code for deploying the network that satisfies hard security constraints in a real production system.

In still another exemplary embodiment of the present invention, a computer program product comprising a computer useable medium having computer program logic recorded thereon for security planning with access control policies, the computer program logic comprises: program code for receiving descriptions of available external inputs and processing components; program code for receiving first security-related requirements of a first network to be developed using the available external inputs and processing components; and program code for generating the first network according to the security-related requirements, wherein the first network satisfies access control policies.

The computer program product further comprises: program code for receiving second security-related requirements of a second network to be developed using the available external inputs and processing components; and program code for generating the second network according to the second security-related requirements, wherein the second network satisfies the access control policies; program code for deploying the first or second networks that satisfy the access control policies in a real production system; and program code for translating privacy constraints into access control policies.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

An automated method for constructing component networks, or modifying existing networks, such that the resulting network satisfies a chosen access control policy (e.g., a hard security constraint, according to an exemplary embodiment of the present invention will now be described.

Figure 1:
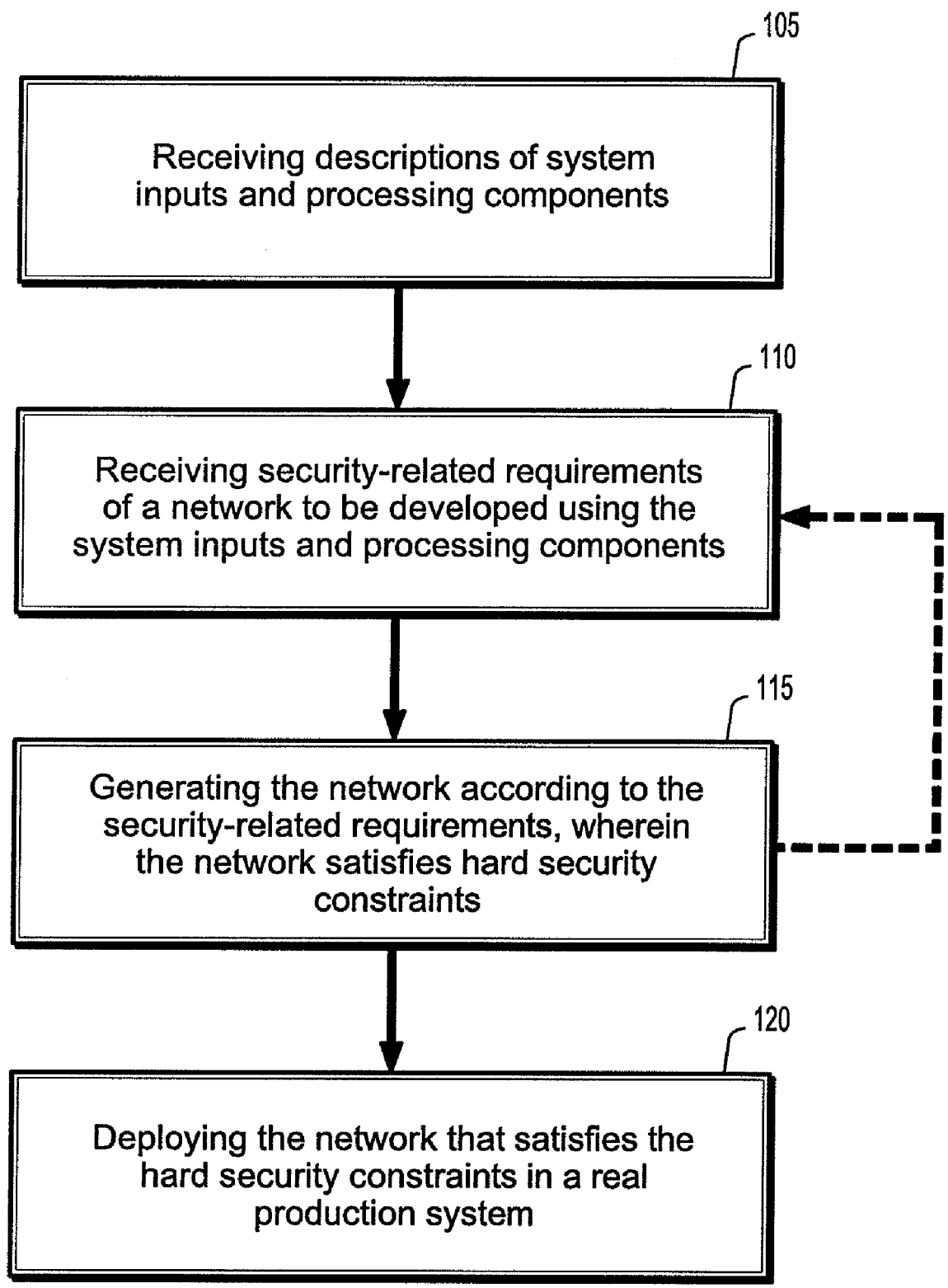
FIG. 1 is a flowchart illustrating a method for security planning with hard security constraints according to an exemplary embodiment of the present invention.

Referring now to FIG. 1, a method for security planning with hard security constraints according to an exemplary embodiment of the present invention is shown. Here, descriptions of each available system input and processing component are created (105). The descriptions may be entered into a database or a knowledgebase computer system for simplified search and data management. The descriptions may include, for example, security properties, as well as specific properties describing the content of entities and functionality of the processing components.

A description of requirements describing results, or the desired outcome, of the processing are input by a user (110).

In other words, security-requirements of a network to be developed using the system inputs and processing components is received. The description of the user requirements includes, for example, a definition of a maximum-accepted security risk level. This level may be fixed by a system-wide security policy or chosen by the user from a range allowed by the system-wide security policy.

After the descriptions of the processing components, system inputs, and user requirements become available, processing components are selected, and a network of processing components, which satisfy an access control policy, is created (115). The network is created by matching an output of a station (or a primal entity) to an input of another station (or a primal entity), and specifying which outputs in the network are the final outputs that contain the product while satisfying the access control policy.

The network is then implemented (e.g., deployed) and used in a real production system (120). It should be appreciated that steps 110 and 115 can be repeated several times (shown by the dotted line of FIG. 1) for constructing an alternative composition (e.g., network) of processing components that satisfy different user objectives.

Figure 2:
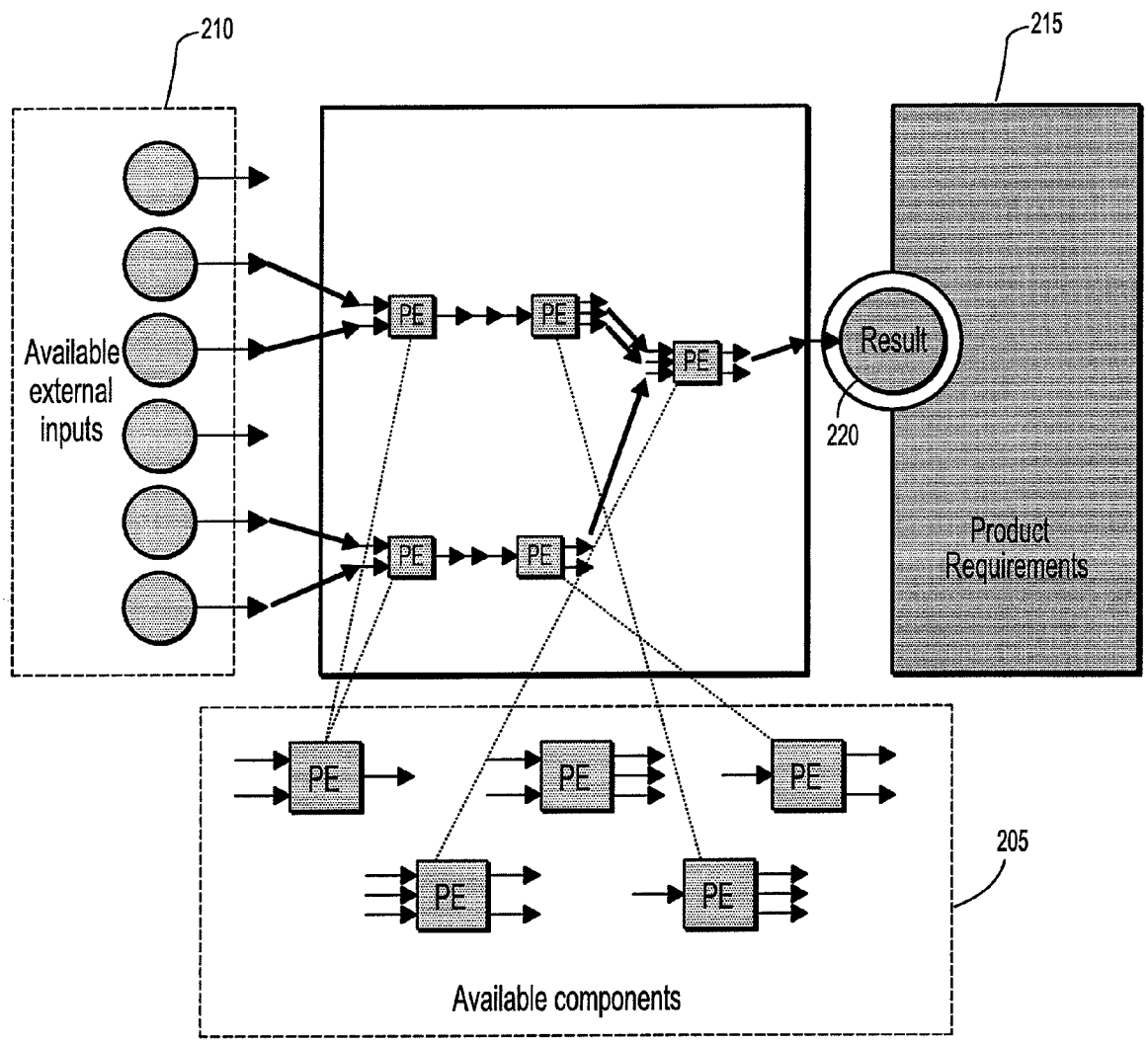
FIG. 2 is a block diagram illustrating a process of generating a network of components according to an exemplary embodiment of the present invention.

Referring now to FIG. 2, the process of generating a component network based on information about processing components 205, information about system inputs 210 and product requirements 215 is illustrated. A result 220, produced by the network must match the product requirements 215, while at the same time satisfy access control policies. The network comprises a selection of the processing components 205, system inputs 210, and interconnections between the processing stations 205 and between the system inputs 210 and processing stations 205.

Now that the method for constructing component networks, or modifying existing networks such that the resulting network satisfies an access control policy has been described, examples of the access policies, hereinafter referred to interchangeably as "hard constraints", "access policies" or "security policies", that must be satisfied when constructing a component network will be described.

First, it is to be understood that to implement access control within component environments using hard constraints, the following considerations must be addressed:

1) The object network and subject labels must be assigned to entities and components within each component network.

2) Access control rules must be verified for all entities produced or consumed by components. Further, if there is a choice in assigning subject and object labels, the labels must be assigned to minimize security risk.

A multi-level security (MLS) Bell-LaPadula policy with Biba integrity labels will now be described. This policy will also be referred to as "MLS".

In a componentized MLS system, each of the components is assigned a single access class on which it operates. Each entity is assigned a label that specifies a minimum access class required to receive the entity. A security policy is comprised of three types of rules:

1) Each component cannot accept any entities that require an access class higher than the component's access class.

2) Each component must label all entities that it produces with a minimum access class equal to or higher than the component's access class. This rule ensures that entities are not relabeled with lower access classes, or are not contained (partially or completely) in the outgoing entities that have lower access classes, and thus, helps to avoids losses. However, special-purpose components, after a mandatory review of their operation, can be authorized to violate this rule and assign lower access classes to output without incurring a security risk.

3) The recipient of the products produced by the network of components is also assigned an access class, and therefore, the products must be entities labeled with the access class of the consumer, or lower.

It is to be understood that violation of any of these rules, except those by special-purpose components according to their permission, results in a security risk. In other words, if the rules are violated, there exists the possibility that the value is lost.

Since a model of the method for constructing component networks, or modifying existing networks such that the resulting network satisfies a chosen access control policy builds upon MLS and Biba integrity models, the model will be described with respect to information, but the model can be easily extended for secure processing of physical objects.

The processing components will be referred to as Processing Elements (PEs), and one-way communication will be modeled between the PEs with streams of data flowing between output and input ports of the PEs. The correctness of this model flows from the correctness results known for MLS and Biba integrity labels.

Security Labels and User Labels will now be discussed.

Security Labels are used for:

1) Labeling data objects according to the sensitivity of information contained therein and the integrity of their data.

2) Describing access permissions and restrictions associated with the subject (e.g., a user of the PEs).

Security labels are elements of label set $\Lambda$, on which a partial order is defined. A partial order denoted by $\preceq$ is a relation on set $\Lambda$, if it is:

1. Reflexive: $a \preceq a$ for all $a$ that are elements of $\Lambda$;
2. Anti-symmetric: $a \preceq b$ and $b \preceq a$ implies $a=b$.
3. Transitive: $a \preceq b$ and $b \preceq c$ implies $a \preceq c$.

The following operations on the elements of the set are defined as:

1. $a \sqcap b$ is equal to an element $c$ of the partially ordered set $\Lambda$ such that $a \preceq c$ and $b \preceq c$, and for all $d \in \Lambda$ such that $a \preceq d$ and $b \preceq d$ it holds that $c \preceq d$.

2. Symmetrically, $a \sqcup b$ is equal to an element $c$ of $\Lambda$ such that $a \succeq c$ and $b \succeq c$, and for all $d \in \Lambda$ such that $a \succeq d$ and $b \succeq d$ it holds that $c \succeq d$.

The partial order is used to control access to objects. Here, the necessary condition for allowing read access of a subject having label $L_2$ to an object with label $L_1$ is that $L_1 \preceq L_2$. If this condition is not satisfied, a read access request will be rejected.

For write requests, the reverse relationship must hold. Here, the subject having label $L_2$ can be allowed to write an object with label $L_1$ only if $L_1 \succeq L_2$.

In security models that allow the use of downgraders, each subject is assigned two labels, e.g., a "read" label and a "write" label. In the former rule mentioned above, the "read" label of the subject is used in place of the subject label $L_2$, and the "write" label is used in place of $L_2$ in the latter rule.

The security models described above are referred to as lattice-based models, where the set $\Lambda$ is referred to as the lattice.

For each inquiry planning request, the credentials of the user making the request uniquely define the user's security label (e.g., user label). The user label plays two roles during the construction of a plan graph:

1) As a constraint on the output stream labels. All output stream labels must be less than the user label in partial order.

2) As an object label for information supplied in an inquiry specification.

There are no other uses of the user label. In particular, the user label is not used to mark the PEs as belonging to any single user.

Primal Stream and User Request Labels followed by Derived Stream and PE Labels will now be discussed.

Each object entering the stream processing system must have a security label assigned thereto. The following information enters the system:

1) Primal streams
2) Inquiry specification.

Each data source specification includes the security label associated with the primal stream produced by the data source. As with all stream labels, the primal stream labels must be equal or exceed in partial order the maximum of all possible labels of all objects that may travel via this stream.

The primal stream labels are assigned by Data Acquirers during the process of registering the data source in the stream. The Data Acquirers may use their judgment for assigning the labels, or use automated data analysis tools that can assist them in defining the labels based on the data that is coming through the data source. These data analysis tools can be developed independently of security planning.

Inquiry specification, including inquiry parameters such as search criteria, carries the label of the requesting user. If any values from inquiry specification are supplied to the PE (e.g., as execution parameters), these values are treated as inputs to the PE for purposes of label computation, and thus, the output of the PE will normally carry the label identifying at least the requesting user if the PE is not a special-purpose trusted PE, which is allowed to reduce labels of processed information.

Labels of derived streams are computed using the transformation formula as described in this section. For each PE the following labels can be specified:

1) The input maximum label $C_j$ for each input port j of the PE, j=1 ... J.
2) The output minimum label $L_k$ and the output maximum label $U_k$ for each output port k of the PE, k=1 ... K (assume $L_k \prec U_k$).

Each of these labels may be omitted in each port specification. For generality, during computation it is assumed that if the input maximum label is not defined for input port j, then $C_j=\infty$, where $\infty$ is the largest label in the partial order, i.e., $1 \prec \infty$ for all labels 1. Similarly, if the maximum output label is not defined for port k, it is assumed that $U_k=\infty$. If the output minimum is not specified for output port k, then it is assumed that $L_k=0$, where 0 is the smallest label in the partial order, i.e., $0 \prec 1$ for all labels 1.

If $U_k \neq \infty$ for some $1 \leq k \leq K$, then the PE is considered a special-purpose trusted PE that must be trusted to write lower security labels than those assigned to the information it receives. Appropriate code review and certification must be performed before registering this PE in the system to ensure that the PE will not leak sensitive information under lower sensitivity labels.

To compute the output label $l'_k$ for each output port k, k=1 ... K, the following additional information is needed:

1) For each input port j, j=1 ... J, the label $l_j$ of the stream connected to that port. The planner must ensure that $l_j \prec C_j$.
2) Additional information regarding input label l. It is assumed that l is equal to the user label if the PE has been configured with parameter values originating from the inquiry specification, and l=0 otherwise.

The output label $l'_k$ is then computed according to this formula:

$$l'_k = \left(l \sqcup L_k \sqcup \left(\coprod_{1 \leq j \leq J} l_j\right)\right) \sqcap U_k.$$

Given a directed acyclic graph representing the workflow, this formula can be applied in iteration, starting from the sources, to compute the label of workflow output based on the labels of workflow inputs.

An example of security labels based on a Caernarvon model will now be discussed.

In the Caernarvon model, a security label is a triple L=(s, c, i), where s is the secrecy level, c is the category set, and i is the integrity level. Each of these components is defined in more detail below. In addition, s=s(L), c=c(L), i=i(L).

Secrecy level is an integer in the interval between constants $S_{min}$ and $S_{max}$. Secrecy level reflects the sensitivity of the information. For example, the higher the sensitivity, the higher the secrecy level. Each number in this range corresponds to one of the secrecy labels such as "top secret", "secret", "confidential" or "unclassified". It is assumed that the ordering is preserved when the labels are mapped to the integers in the $[S_{min}, S_{max}]$ interval, where $S_{max}$ corresponds to the most sensitive information and $S_{min}$ to the least sensitive information.

In the labels assigned to streams, secrecy level corresponds to the maximum secrecy level over all objects that can pass through the stream.

Category set is the set of categories to which the object belongs. An object can belong to zero or more categories. A planning solver can view c as a zero-one set membership vector, which contains ones for every category that is relevant for the object, and zero for all other categories.

In the labels assigned to streams, category set corresponds to the union of category sets of all objects that can pass through the stream.

Integrity level describes trustworthiness of the information. It is an integer in the interval $[I_{min}, I_{max}]$. It can correspond, for example, to an integrity level in the Biba integrity model.

A partial order is defined as follows. Label $L_1=(s_1,c_1,i_1)$ precedes label $L_2=(s_2,c_2,i_2)$ in the partial order, and $L_1 \prec L_2$ is written, if and only if each of the following conditions is satisfied:

1) $s_1 \leq s_2$
2) $c_1 \subset c_2$
3) $i_1 \geq i_2$.

The following notation is used to represent such a security label, assuming letters A-Z denote available categories:

([2,{A,D,Z}],5).

Examples of a partial order comparison are shown below:

([2,{A,D,Z}],5) $\prec$ ([4,{A,B,C,D,Z}],3).

With the partial order, it is possible that some elements of the set are not comparable, see below:

([2,{A,D,X,Z}],5) $\not\prec$ ([4,{A,B,C,D,Z}],3)
([2,{A,D,Z}],2) $\not\prec$ ([4,{A,B,C,D,Z}],3)

The combination operations on the labels, for any two labels $L_1=(s_1,c_1,i_1)$ and $L_2=(s_2,c_2,i_2)$ are defined as: $L_1 \sqcup L_2 = (\max\{s_1,s_2\}, c_1 \cup c_2, \min\{i_1,i_2\})$ and symmetrically, $L_1 \sqcap L_2 = (\min\{s_1,s_2\}, c_1 \cap c_2, \max\{i_1,i_2\})$.

Now that several access control policies have been described, the implementation of security planning with hard constraints will be discussed.

The implementation of security planning with hard constraints requires representing the user, data source, and PE labels as predicates in the planning domain. The methods for representing these labels typically depend of the expressivity of the planning task description language, and on the nature of the labels. Two exemplary methods will be described below.

It is to be understood that both examples consider security labels of the Caernarvon model described above. One of the examples uses Planning Domain Definition Language (PDDL) representation for planning tasks, and the other uses Stream Processing Planning Language (SPPL) representation. Depending on the representation, different planners can be used to construct plans. Although various planners exist for both PDDL and SPPL, if the planning task is described correctly, e.g., such that the security policy rules described above for general labels from the lattice are expressed and enforced by the planner, the resulting workflows will be compliant with the security policy independent of which planner is used.

It should also be understood that elements of the description of the planning task given below are necessary, but not sufficient, and other constraints, such as input-output data type compatibility between communicating PEs, etc. can be added.

A PDDL encoding of Bell-LaPadula policy with Biba integrity labels in which each processing component is represented by a PDDL action, and a stream is represented by a PDDL object, will now be described.

A general workflow planning problem in PDDL uses a straightforward approach, representing each stream by a stream object. For simplicity it is assumed that the composition rules in the system are represented by a system of types. As long as a stream contains a type required by an input port of the component, the stream can be connected to the port, resulting in a valid workflow. More complex rules, including various optimization criteria, can also be implemented. Since all objects to be used are of type stream, one PDDL type is defined as follows:

```
(:types stream)
```

One predicate (has-type-X ?s-stream) is defined for each type X. If true in some state, it means that stream ?s carries type X in that state. In addition, it is needed to keep track of initialized streams, so that newly created streams do not overwrite a description of the streams produced by other actions. Therefore, a predicate (unused ?s-stream) is defined, which, if true in some state, means that stream object ?s is not yet an instantiated stream in that state, and it is safe to use it as an output stream of an action. A special predicate (goal-reached) is introduced that holds in the goal state. Here is an example predicate definition for the planning domain:

```
(:predicates
    (has-type-video ?s - stream)
    (has-type-audio ?s - stream)
    ...
    (has-type-temperature ?s - stream)
    (unused ?s - stream)
    (goal-reached)
)
```

Description of actions then will have the following form:

```
(:action A
    (:parameters ?in1 ?in2 ?in3 ?out1 ?out2 - stream)
    (:precondition (and (has-type-audio ?in1)
        (has-type-temperature ?in2) (has-type-video ?in3)
        (unused ?out1) (unused ?out2)))
    (:effect (and (has-type-humidity ?out1)
        (has-type-detected-motion ?out2)
        (not (unused ?out1)) (not (unused ?out2))) )
)
```

A goal-reaching action is also introduced. The precondition of this action can be used to describe conditions the end user requirements place on the output stream. Within the model of composition rules, these conditions are given in the form of type requirements, just like action preconditions. This action has a single effect of setting the (goal-reached) predicate.

```
(:action ReachGoal
    (:parameters ?in1 ?in2)
    (:precondition (and
        (has-type-humidity ?in1) (has-type-temperature ?in2)))
    (:effect (goal-reached))
)
```

As will be shown in this example, each action specifies required types of input ports in the precondition, and the produced types are assigned to new streams in the effect statement. Also, it is required that each output stream is not used before the action is applied, and is to be marked as used in the effect of the action, making them unchangeable by other actions after this action initializes the objects.

The above statements describe the planning domain. To describe the planning problem, objects and initial and goal states need to be described. First, enough stream objects are introduced so that the total number of available objects would be sufficient for any practical workflow created by the planner. In this example 200 stream objects are created. In PDDL each object must have a name, therefore, arbitrary names are assigned to the objects. These names are later used to establish connections between input and output ports.

```
(:objects s1 s2 s3 s4 s5 ... s200 - stream)
```

Initial state describes the types of primal streams, and marks every non-primal stream object as un-initialized.

```
(:init (has-type-audio s1) (has-type-temperature s2)
    (unused s3) ... (unused s200) )
```

Finally, goal statement specifies that the workflow must find a feasible solution.

```
(:goal (goal-reached) )
```

The domain and problem description introduced above represent the workflow composition problem in PDDL. Any solution (e.g., valid plan) constructed for this problem can be directly mapped to a valid workflow achieving the goal. In practical implementations domain-specific optimization criteria and/or resource constraints may be added to require that the best possible solution is produced.

However, the resulting workflow may not be compliant with the security policy. Thus, a set of predicates describing security labels assigned to the streams needs to be introduced. The predicates are as follows:

1) For each category X, a predicate (no-category-X ?s-stream) is introduced, where ?s is a variable that represents a stream object. If in any state this predicate is true for stream ?s, the category set of the label assigned to stream ?s does not contain category X in that state.

2) For each secrecy level V, which by definition is an integer in a limited range, a predicate (secrecy-below-V ?s) is introduced, which, if true in some state, means that a secrecy level of the label assigned to stream ?s is less than V in that state.

3) For each integrity level U, which also is an integer from a limited range, a predicate (integrity-above-U ?s) is introduced. This predicate, if true in some state, means that in that state stream ?s has label with an integrity level higher than U.

These predicates are used as follows:

1) For each primal stream S, its security label L=(s,c,i) is translated to the predicates defined above. In particular, the following additional predicates must be included in the :init statement:
   a) For all secrecy levels strictly higher that that of the label, i.e., $\forall s'>s$, define predicate (secrecy-below-s' S)
   b) For all possible categories not in the set of categories in the label, i.e., $\forall c' \notin c$, define predicate (no-category-c' S)
   c) For all integrity levels strictly lower than that of the label, i.e., $\forall i'<i$, define predicate (integrity-above-$i'$ S).

2) For each action corresponding to a component, labels corresponding to input ports $\{C_j: 1 \leq j \leq J\}$ and labels corresponding to output ports $\{L_k, U_k : 1 \leq k \leq K\}$ are reflected in action description as follows:
   a) For every input port j, $1 \leq j \leq J$ which corresponds to a variable ?sj in a PDDL representation of the action, include the following predicates in the precondition of the action:
      a1) If $s(C_j) < S_{max}$, include predicate (secrecy-below-$s'$ ?sj), where $s'=s(C_j)+1$
      a2) For all categories not in the set of categories in the label $C_j$, i.e. $\forall c' \notin c(C_j)$, include predicate (no-category-$c'$ ?sj).
      a3) If $i(C_j) > I_{min}$, include predicate (integrity-above-$i'$ ?sj), where $i'=i(C_j)-1$,
   b) For every output port k, $1 \leq k \leq K$ which corresponds to a variable ?sk in a PDDL representation of the action, include the following predicates in the effect of the action:
      b1) $\forall s': s(L_k) < s' \leq s(U_k)$ include the conditional effect
      (when (and (secrecy-below-s' ?in1)
         (secrecy-below-s' ?in2) . . .
         (secrecy-below-s' ?in J))
         (secrecy-below-s' ?sk))
      where the condition is checked for all variables corresponding to the input ports of the action ?in1, ?in 2, . . . , ?in J.
      b2) $\forall c': c' \notin c(L_k), c' \in c(U_k)$ include the conditional effect
      (when (and (no-category-c' in1)
         (no-category-c' ?in2) . . .
         (no-category-c' ?in J))
         (no-category-c' ?sk))

where, as above, the condition is checked for all variables corresponding to the input ports of the action ?in 1, ?in2, . . . , ?in J.
      b3) $\forall i': i(U_k) \leq i' < i(L_k)$ include the conditional effect
      (when (and (integrity-above-$i'$ ?in1)
         (integrity-above-$i'$ ?in2) . . .
         (integrity-above-$i'$ inJ))
         (integrity-above-$i'$ ?sk))
      where, as above, the condition is checked for all variables corresponding to the input ports of the action ?in 1, ?in2, . . . , ?in J.
      1) $\forall s': s(U_k) < s' \leq S_{max}$ include effect (secrecy-below-s' ?sk)
      2) $\forall c': c' \notin c(U_k)$ include effect (no-category-c' ?sk)
      3) $\forall i': I_{min} \leq i' < i(U_k)$ include effect (integrity-above-$i'$ ?sk)
   c) In the goal-reaching action a user's label is to be expressed as a precondition label. The representation of the label as a precondition should follow the model described for representing $C_j$ labels as preconditions above.

As can be gleaned, the workflow constructed by the planner for the updated problem representation will satisfy the security policy. The predicates introduced for implementing the security model uniquely describe labels assigned to streams in the composed workflow.

A similar approach can be used to describe the workflow composition problem using SPPL. This will now be described.

The type matching predicates in SPPL are defined as part of the CLEAR-logic group, and stream variables and unused predicates are no longer necessary:

```
(:predicates :clearlogic
    (has-type-video)
    (has-type-audio)
    ...
    (has-type-temperature)
)
```

Description of action describes preconditions and effects on every input and output port correspondingly. In SPPL, goal reaching action is no longer needed.

```
(:action A
    (:precondition [in1] (has-type-audio))
    (:precondition [in2] (has-type-temperature))
    (:precondition [in3] (has-type-video))
    (:effect [out1] (has-type-humidity))
    (:effect [out2] (has-type-detected-motion))
)
```

Since declaring explicit stream objects are not needed in SPPL, the only declarations that must be present in problem definition are goal and init statements. One init statement per primal stream, and one goal statement per output stream are required.

```
(:init (has-type-audio))
(:init (has-type-temperature))
(:goal (has-type-humidity))
(:goal (has-type-temperature))
```

The problem described in SPPL can be solved by a suitable solver, which will produce a feasible workflow. However, for the workflow to satisfy security constraints, additional security predicates must be introduced. The predicates are defined as part of an AND-logic predicate propagation group, by specifying :andlogic in the predicate declaration statement. For each security predicate defined in PDDL, a similar predicate is defined in SPPL, but without the stream parameter. In particular, 1) For each category X, a predicate (no-category-X) is introduced. If in any state this predicate is true for a stream, the category set of the label assigned to stream ?s does not contain category X in that state.

2) For each secrecy level V, which by definition is an integer in a limited range, a predicate (secrecy-below-V) is introduced, which, if true in some state, means that a secrecy level of the label assigned to the stream is less than V in that state.

3) For each integrity level U, which also is an integer from a limited range, a predicate (integrity-above-U) is introduced. This predicate, if true in some state, means that in that state the stream has a label with an integrity level higher than U.

Similarly to PDDL encoding, the use of the predicates in the SPPL problem and domain description are defined as:

1) For each primal stream its security label L=(s,c,i) is translated to the predicates defined above. In particular, the following additional predicates must be included in the :init statement:
  a) For all secrecy levels strictly higher that that of the label, i.e., $\forall s' > s$, define predicate (secrecy-below-s')
  b) For all possible categories not in the set of categories in the label, i.e., $\forall c' \notin c$, define predicate (no-category-c')
  c) For all integrity levels strictly lower than that of the label, i.e., $\forall i' < i$, define predicate (integrity-above-i').

2) For each action corresponding to a component, labels corresponding to input ports $\{C_j : 1 \leq j \leq J\}$ and labels corresponding to output ports $\{L_k, U_k : 1 \leq k \leq K\}$ are reflected in an action description as follows:
  a) For every input port j, $1 \leq j \leq J$ include the following predicates in the corresponding precondition of the action:
    a1) If $s(C_j) < S_{max}$, include predicate (secrecy-below-s'), where $s' = s(C_j) + 1$.
    a2) For all categories not in the set of categories in the label $C_j$, i.e. $\forall c' \notin c(C_j)$, include predicate (no-category-c').
    a3) If $i(C_j) > I_{min}$, include predicate (integrity-above-i'), where $i' = i(C_j) - 1$.
  b) For every output port k, $1 \leq k \leq K$ include the following predicates in the corresponding effect of the action:
    b1) $\forall s': s' \leq s(L_k)$ include negative effect (not (secrecy-below-s'))
    b2) $\forall c': c' \in c(L_k)$ include negative effect (not (no-category-c'))
    b3) $\forall i': i' \geq i(L_k)$ include negative effect (not(integrity-above-i'))
    b4) $\forall s': s(U_k) < s' \leq S_{max}$ include effect (secrecy-below-s')
    b5) $\forall c': c' \notin c(U_k)$ include effect (no-category-c')
    b6) $\forall i': I_{min} \leq i' < i(U_k)$ include effect (integrity-above-i')

3) In the goal express a user's label as precondition label. The representation of the label as precondition should follow the model described for representing $C_j$ labels as preconditions above.

It is to be understood that this SPPL domain and problem description can be used to compose workflows complying with the security policy, with or without plan quality optimization and/or resource constraints. Additional constraints and optimization objectives may be added, but any plan feasible in this description will comply with the policy.

A list of assumptions needed to have an effective algorithm for planning using hard constraints is as follows:

1) Workflow composition based on type matching and security hard constraints (as used in PDDL and SPPL representations above) is an NP-complete decision problem.

2) In the absence of trusted components (e.g., if there are no components with $U_k \neq \infty$) the composition problem can be solved efficiently in time O(m), where m is the number of available components.

3) Assume that for all inputs of all components there are no security preconditions, e.g., for all components $\forall_j C_j = \infty$. In the following cases efficient algorithms exist:
  a) If there exists a total order between all upper bound labels $U_k$, the workflow composition problem can be solved in O(m) operations.
  b) If the number of types such that more than one component produces them, is limited by logarithm of m, an O(m) algorithm exists.
  c) If the number of distinct upper bound labels $U_k$ is bounded by b, then there exists an algorithm that finds a workflow satisfying the security policy in $O(2^{b+1}(S_{max} - S_{min} + 1)^2 m^2)$ operations.

Although the embodiments of the present invention have been described above as using MLS access policies for security planning, an alternative embodiment employing a multi-set attribute policy (MSA) in conjunction with the aforementioned hard constraints can also be used for security planning.

Here, the translation of MSA policy and MSA metadata into Caernarvon policy and metadata, followed by the application of the planning methods described in this invention will be described. First, the structure of MSA policy rules will be briefly discussed, and then an outline of the process of translating MSA labels to Caernarvon labels will be given.

MSA uses labels to annotate objects and subjects. Each MSA label consists of 0, 1 or more (attribute, risk) pairs, where 1) attribute is the name of an attribute denoting a category of privacy-sensitive information, and 2) risk is the value characterizing the likelihood of deriving this information from the data annotated by the label.

At most one (attribute, risk) pair for each attribute is allowed in a label. In addition to the pairs, the MSA label may contain an integrity level value.

In an MSA model, the privacy policy can also specify input attribute combination constraints as part of the subject label or labels. However, here a restricted version of an MSA model is considered where such constraints are not specified.

The following label mapping procedure can be used during the mapping of MSA policy to Caernarvon policy. Once a set of categories is created, the labels are processed for each component separately, to define the labels $C_1$, $U_k$ and $L_k$ for each component. The procedure is as follows:

1) Create a new MLS category for every unique combination of (attribute, risk) used in any MSA label. All MSA labels used in the description of components, user credentials, or sources should be considered during this operation. For simplicity, the MLS category "attribute-risk" corresponds to the MSA pair (attribute, risk).

2) All MSA READ access labels are translated to input maximum labels $C_j$, where for all j,
  a) Starting with empty category set in $C_j$, for each (attribute, risk) pair in the MSA READ label, add to $C_j$ all defined categories "attribute-R" for which R≤risk.
  b) Integrity level of $C_j$ is the same as the integrity level of the MLS label.

3) All MSA SUPPRESS labels are translated to output maximum labels $U_k$, such that for all outputs k,
   a) Starting with an empty category set in $U_k$, for each (attribute, risk) pair in the MSA label, add to $U_k$ all defined categories "attribute-R" for which R≦risk.
   b) For each attribute "attribute" that is not in the MSA SUPPRESS label, add to $U_k$ all defined categories "attribute-risk".
   c) Let integrity level of $U_k$ be the same as that of the MSA SUPPRESS label.

4) All MSA SELECTION and ADDITION labels are translated to output minimum labels $L_k$, such that for all outputs k,
   a) Starting with an empty category set in $L_k$, for each (attribute, risk) pair in the MSA labels, add to $L_k$ all defined categories "attribute-R" for which R≦risk.
   b) Let the integrity level of $L_k$ be the smallest of the integrity levels of the supplied SELECTION and ADDITION MSA labels for the component.

5) For all MSA WRITE labels the $L_k$ label is computed similarly to the ADDITION labels, and $U_k$ is chosen to be equal to $L_k$.

6) Secrecy levels for all labels must be set to the same constant value, for example, PUBLIC.

Due to the similarity of propagation and access rules, it is straightforward to verify that after the labels are mapped, if the rules of the Caernarvon policy are enforced in the resulting system, the rules of MSA model will be enforced automatically. Thus, a Caernarvon policy and an MSA policy can be enforced simultaneously within the same workflow using the method described in the embodiments above. To enforce both policies, it is necessary to ensure that the categories created by the mapping procedure do not overlap with the original set of categories. In addition, the computation of MLS labels must start not from empty category set, but from the category set defined by the Caernarvon metadata, and the secrecy levels must be set based on the same metadata.

According to an exemplary embodiment of the present invention, a network can be automatically constructed based on metadata describing components, sources and product requirements, wherein the network satisfies the specified requirements and complies with an access control policy. By constructing a network according to an exemplary embodiment of the present invention, security risks can be managed and mitigated automatically as compared to existing manual or single-level security methods. Thus, analysis of the network can be increased, potential human errors resulting from manually constructing such a network can be decreased and entities of multiple security levels can be processed. In addition, a secure large-scale system that is composed of hundreds or even thousands of networks can be verifiably constructed.

By automatically constructing networks, after necessary reviews and certification, the planner can act as a trusted component, thus reducing the need for employing trusted personnel for composing the networks that involve sensitive (e.g., valuable) sources or components. For example, users with low access rights can request workflows processing data from sensitive sources or using sensitive algorithms, provided that the data is downgraded during processing. As compared to traditional systems, these users would need assistance from users with higher privileges to achieve this, thus resulting in delays. In addition, the metadata describing the components and entities can be sensitive (e.g., valuable), thus providing additional trust requirements to the planner.

It is to be understood that the present invention may be applied to any lattice based secrecy model or any lattice based secrecy model augmented by a lattice-based data integrity model. The present invention may also be applied with or without trusted components such as secrecy downgrades and integrity upgraders.

It should also be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for security planning with access control policies, comprising:
   receiving descriptions of available external inputs and processing components, wherein a first processing component description identifies data receivable by the first processing component, a function the first processing component performs on the received data and data produced by the first processing component as a result of performing the function;
   receiving first security-related requirements and a desired output result of a first network to be developed using the available external input and processing component descriptions; and
   generating the first network according to the security-related requirements, wherein the first network satisfies access control policies and includes external inputs and processing components, wherein the processing components are configured such that the first network produces the desired output result,
   wherein to satisfy the access control policies, the following rules are adhered to: (1) each processing component of the first network cannot accept any data that require an access class higher than the component's access class and (2) each processing component of the first network must label all data it produces with a minimum access class equal to or higher than the component's access class, yet after review of the operation of the processing components, at least one of the processing components is authorized to violate rule (2) and assign lower access classes to its data without incurring a security risk, wherein generating the first network according to the security-related requirements further comprises:

verifying access control policies for the external inputs and processing components in the first network, based on subject labels assigned to the processing components and object labels assigned to the external inputs.

2. The method of claim 1, further comprising:

receiving second security-related requirements of a second network to be developed using the available external inputs and processing components; and generating the second network according to the second security-related requirements, wherein the second network satisfies the access control policies.

3. The method of claim 2, further comprising:

deploying the first or second networks that satisfy the access control policies in a real production system.

4. The method of claim 2, wherein the first or second networks that satisfy the access control policies are newly generated networks or modifications of existing networks.

5. The method of claim 1, further comprising:

translating privacy constraints into access control policies.

6. A computer program product comprising computer program logic recorded on a non-transitory computer useable medium for security planning with access control policies, the computer program logic comprising:

program code for receiving descriptions of available external inputs and processing components, wherein a first processing component description identifies data receivable by the first processing component, a function the first processing component performs on the received data and data produced by the first processing component as a result of performing the function;

program code for receiving first security-related requirements and a desired output result of a first network to be developed using the available external input and processing component descriptions; and program code for generating the first network according to the security-related requirements, wherein the first network satisfies access control policies and includes external inputs and processing components, wherein the processing components are configured such that the first network produces the desired output result, wherein to satisfy the access control policies, the following rules are adhered to: (1) each processing component of the first network cannot accept any data that require an access class higher than the component's access class and (2) each processing component of the first network must label all data it produces with a minimum access class equal to or higher than the component's access class, yet after review of the operation of the processing components, at least one of the processing components is authorized to violate rule (2) and assign lower access classes to its data without incurring a security risk, wherein the program code for generating the first network according to the security-related requirements further comprises:

program code for verifying access control policies for the external inputs and processing components in the first network, based on subject labels assigned to the processing components and object labels assigned to the external inputs.

7. The computer program product of claim 6, further comprising:

program code for receiving second security-related requirements of a second network to be developed using the available external inputs and processing components; and program code for generating the second network according to the second security-related requirements, wherein the second network satisfies the access control policies.

8. The computer program product of claim 7, further comprising:

program code for deploying the first or second networks that satisfy the access control policies in a real production system.

9. The computer program product of claim 6, further comprising:

program code for translating privacy constraints into access control policies.

10. The computer program product of claim 6, wherein the access control policies comprise Biba integrity constraints.

11. The method of claim 1, wherein the first network is generated by an automated planner and is deployed without user review.

12. The method of claim 1, wherein the first network is generated using a planning algorithm.

13. The method of claim 12, wherein the planning algorithm receives a planning task in Planning Domain Definition Language (PDDL) or Stream Processing Planning Language (SPPL) format.

14. The method of claim 1, wherein the descriptions of available external inputs and processing components comprise metadata.

15. The method of claim 1, further comprising:

deploying the first network in a real production system.

16. The method of claim 1, wherein the first network includes a downgrader.

17. The computer program product of claim 6, further comprising:

program code for deploying the first network that satisfies hard security constraints in a real production system.

* * * * *